United States Patent [19]
Voss

[11] 4,331,995
[45] May 25, 1982

[54] PHASE UNBALANCE PROTECTOR

[75] Inventor: Earl Voss, Siloam Springs, Ark.

[73] Assignee: Diversified Electronics, Inc., Evansville, Ind.

[21] Appl. No.: 230,449

[22] Filed: Feb. 2, 1981

[51] Int. Cl.³ .............................................. H02H 3/24
[52] U.S. Cl. ........................................ 361/85; 361/92
[58] Field of Search ...................... 361/76, 85, 90, 92; 340/663; 328/135, 151

[56] References Cited

U.S. PATENT DOCUMENTS

| | | | |
|---|---|---|---|
| 3,155,880 | 11/1964 | Salina | 361/85 X |
| 3,783,341 | 1/1974 | Beckwith | 361/85 |
| 4,021,703 | 5/1977 | Gary et al. | 361/85 |
| 4,222,008 | 9/1980 | Mezrich | 328/151 X |
| 4,238,811 | 12/1980 | Fry | 361/92 |

Primary Examiner—Reinhard J. Eisenzopf
Attorney, Agent, or Firm—Robert R. Keegan

[57] ABSTRACT

There is disclosed apparatus for detecting phase unbalance in a 3-phase electric power system and initiating protective shutdown for motors or other loads in the system which includes a 3-phase rectifier, a peak voltage measuring circuit, a comparison circuit for comparing each phase maximum with a predetermined proportion of the peak voltage and generating a pulse whenever a phase maximum exceeds the predetermined proportion of the peak voltage, a missing-pulse detection circuit receiving the pulses, a fault circuit producing a fault signal in response to a signal from the missing-pulse circuit, a delay circuit responsive to the fault circuit and a visual indicator and relay for indicating a persistent phase unbalance fault and initiating protective action.

20 Claims, 5 Drawing Figures

PHASE UNBALANCE PROTECTOR

The apparatus of the present invention relates to protection of electrical equipment vulnerably exposed to malfunctions in a 3-phase power supply. It would, of course, also be adaptable to power supplies of more than 3-phases. The apparatus may be employed in both delta and wye systems; no connection to neutral is required.

Apparatus for protection against potentially damaging situations in an electrical power system are very common. There are systems for detection and indication of abnormally high or low voltage (including transients), improper frequency, etc. Protective apparatus may involve relays, circuit breakers, or other devices to shut down motors or other equipment which may be subject to damage from a power system malfunction. The present apparatus is designed to protect against one specific form of electrical system fault, namely, phase unbalance (which should be understood to include phase loss).

Apparatus according to the present invention protects against phase unbalance in a simpler yet more effective manner than any apparatus of the prior art. The present apparatus, for example, will deal with phase loss in a system powering one or more 3-phase motors even though phase loss in such a system tends to be obscured by a phenomenon known as regeneration. To further explain this situation, it should be noted that apparatus of the present invention employs a relatively simple voltage monitoring device. When one phase is lost in a system with 3-phase motor loads, the motor or motors serve as generators for the open phase and the voltage measured at the input to the motor may be nearly equal to the normal phase-to-phase voltage. The currents in the system give a better reflection of the phase unbalance, but far more complicated apparatus would be required to monitor the current in the 3-phase electrical power system.

Because the loss of a phase in such a system tends to be concealed from a voltage monitor device, it is an important feature of the present apparatus that it be capable of detecting quite small observed voltage unbalances (as little as about 2%). Apparatus of the present invention is, in fact, capable of detecting voltage unbalances considerably less than normal and acceptable voltage variations due to imperfect utility voltage regulation. This is accomplished by comparing the phase voltages to one another rather than to a voltage reference.

The adverse effect of phase unbalance on motors or other devices does not occur unless the condition persists over a period considerably longer than the fraction of a cycle represented by one missing half wave of one phase, which is internally detected by the present apparatus. The phase unbalance protector is provided with a time delay circuit which prevents actuation of the protective relay for a transient condition. The phase balance is thus closely monitored without causing a high incidence of false-alarm relay operations.

A simple adjustment may be provided for setting the desired sensitivity of the phase unbalance protector. Preferably the sensitivity may be adjusted from about 2% to about 10% (variation from nominal voltage). Adjustment of the unbalance reference between 2% and 10% is generally not critical to the operation of the device. It can be appreciated, however, that a user of the device with a load which is not a predominantly motor load would be permitted to reduce the sensitivity of the detector because the regeneration problem referred to previously would not be a significant factor.

Previous apparatus directed to the problem of phase unbalance has not approached the problem in the simple and effective manner of the present apparatus. In particular, previous apparatus did not employ a comparison of the peak phase voltage with each succeeding phase maximum for the purpose of detecting the failure of one phase to equal or exceed a predetermined fraction of the preceding peak voltage. It also failed to provide means for withholding a fault signal unless several consecutive such failures occurred. An example of a prior art device is shown in U.S. Pat. No. 3,155,880.

In addition to providing the above-described features and advantages, it is an object of the present invention to provide a phase unbalance protective device which will detect a persistent drop in one phase of a 3-phase electrical system and produce a fault signal responsive thereto for activating an indicator and a protective relay.

It is another object of the present invention to provide a phase unbalance protective device which is very sensitive to differences between phase voltages in order that phase loss can be detected even where it is obscured by regeneration from 3-phase motors in the system.

It is still another object of the present invention to provide a sensitive phase unbalance detection device which is largely unaffected by transients and variations in all-phase voltage of the system.

Other objects and advantages of the present apparatus will be apparent from consideration of the following description in conjunction with the appended drawings in which.

Figure 1:
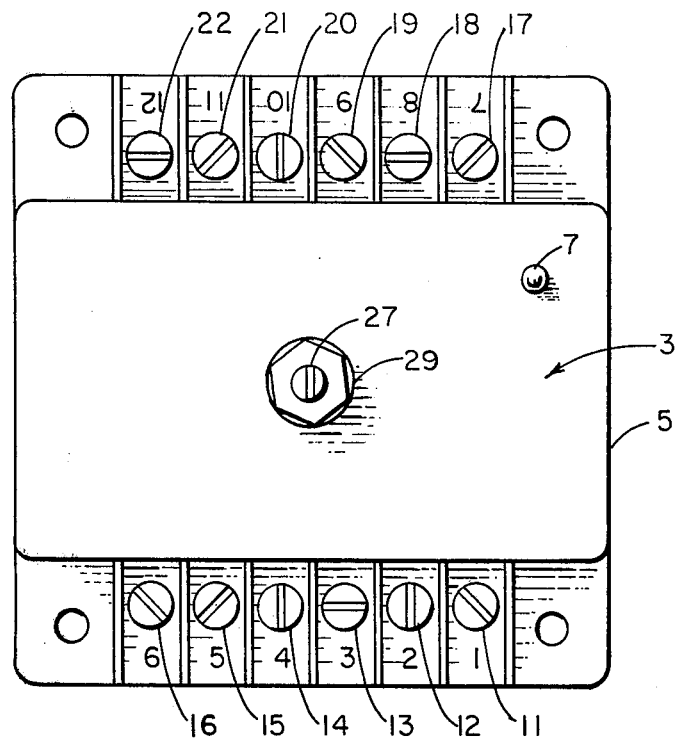
FIG. 1 is a top plan view of a phase unbalance protector apparatus according to the invention.
Figure 2:
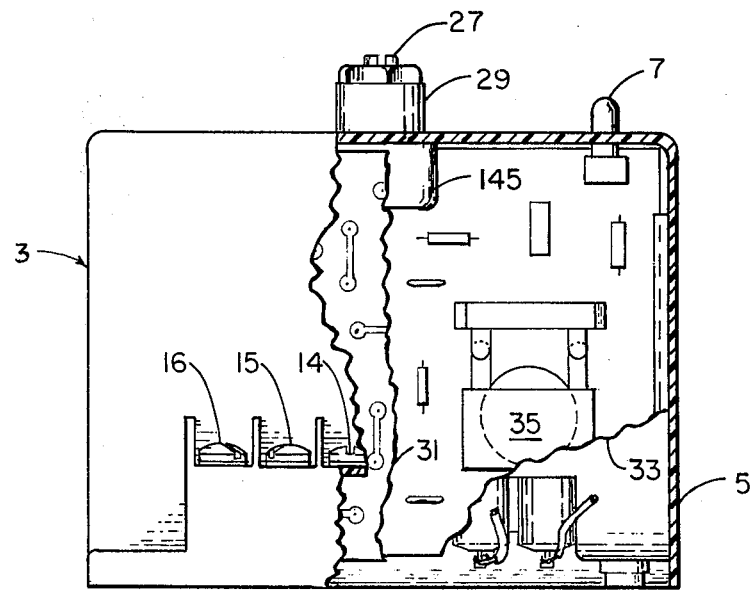
FIG. 2 is a front elevational view of the apparatus of FIG. 1 broken away to show the arrangement of internal components.

Referring now to the drawings and particularly FIGS. 1 and 2, a phase unbalance protector 3 is shown having a housing 5 of a suitable rigid plastic or other material. External to the housing 5 are provided electrical terminals 11 through 22 (only nine of which are actively used in the circuit of the device).

An indicator lamp 7 which may be a light emitting diode is provided as a visible indicator of a persistent phase unbalance. Lamp 7 is an optional feature of the device and the device may instead be arranged to provide signals to external visual or audible indicators or circuit breakers.

Adjustment for sensitivity is provided by variable resistor 105 having an external screw adjustment 27 and a lock nut 29. According to customary practice the electrical circuit components for the phase unbalance protector 3 may be mounted on circuit boards 31 and 33 which are in turn supported in grooves in housing 5. A bottom cover panel (not shown) may be provided to enclose the interior of housing 5. The outputs from the protector 3 are provided by electromechanical relay 35 mounted on circuit board 33. A solid state relay or comparable device may be substituted for the electromechanical relay 35, if desired. In the illustrated embodiment relay 35 is a double-pole-double-throw relay for maximum convenience of the user even though a single set of contacts will usually be sufficient to operate the circuit breaker or other external device associated with the phase unbalance protector 3. The other contacts may be employed for audible alarms or other devices.

In the illustrated embodiment the three phases of the electrical system are conductively connected to terminals 11, 13 and 15; terminals 18 and 21 are common terminals of the relay 35. Terminals 17, 20 are normally closed and 19, 22 normally open contacts associated with terminals 18 and 21 respectively.

Figure 3:
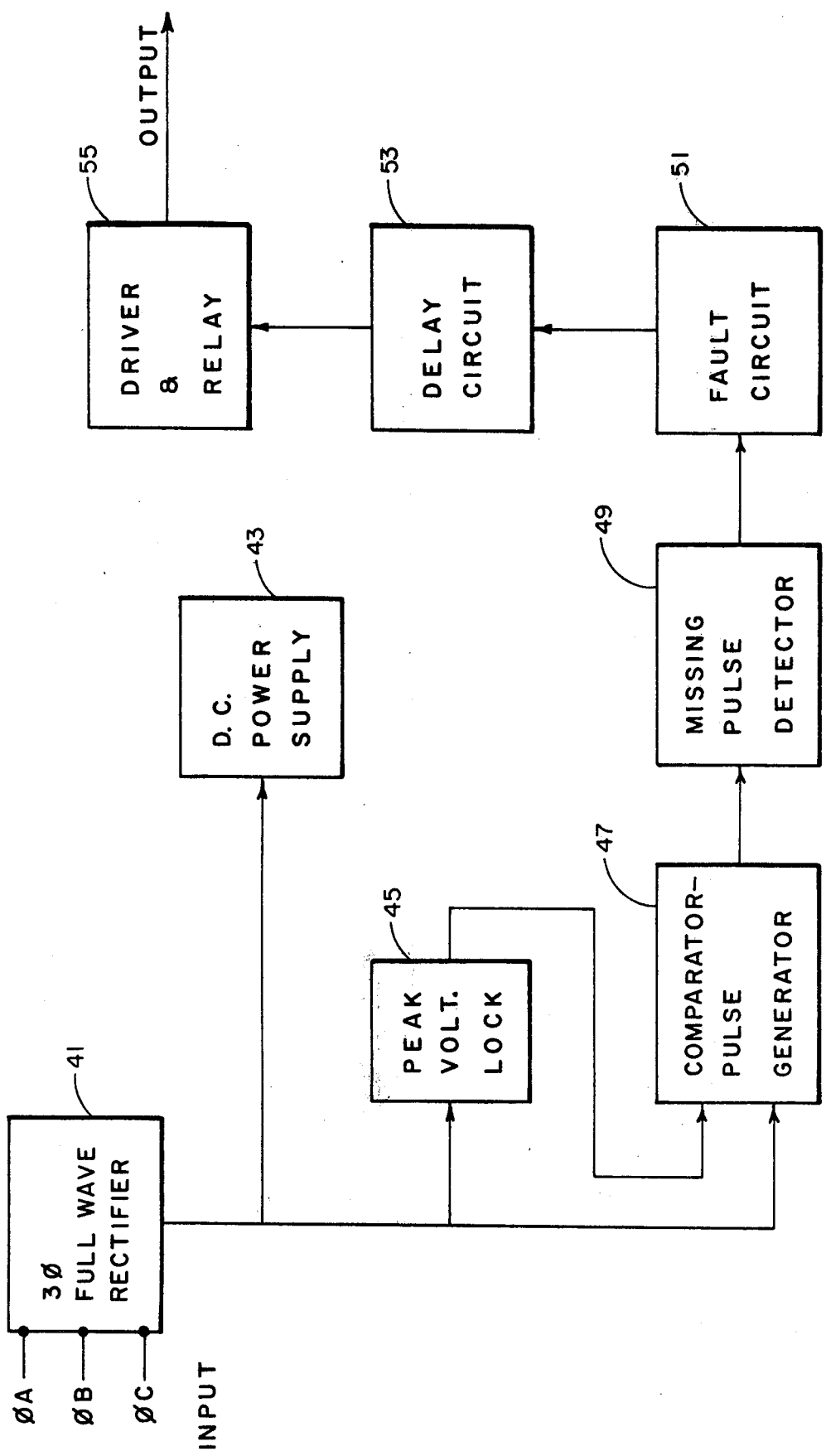
FIG. 3 is a schematic block diagram of the apparatus of the invention.

FIG. 3 shows the schematic block diagram of the circuit of the phase unbalance protector 3. A full-wave 3-phase rectifier 41 receives the 3-phase input of the system being monitored and produces a pulsating DC output. The output of rectifier 41 is incidentally used to energize the DC power supply 43 providing the small amount of power (approximately 3 watts) required for the circuits of the protector apparatus. While rectifier 41 is illustrated as a 3-phase full-wave rectifier, other apparatus may be used to provide a signal to the phase unbalance detection circuits. For example, a half-wave rectifier may be employed or any other circuit which provides sequential pulses with amplitudes corresponding to the amplitudes of the separate phases of the electrical system being monitored.

The output of rectifier 41 is provided to a peak voltage lock circuit 45 and a comparator-pulse generator circuit 47. The peak voltage lock circuit 45 measures the highest instantaneous voltage of any of the three phases and locks that voltage for comparison with immediately succeeding phase pulses. The output of peak voltage lock circuit 45 is fed to comparator pulse generator 47 together with the output of rectifier circuit 41. In comparator pulse generator circuit 47 a comparison is made between phase pulses from rectifier 41 and a predetermined portion (from 80% to 96%) of the peak voltage from circuit 45. Whenever a phase pulse has a voltage at least equal to the predetermined portion of the peak voltage, a pulse is generated by comparator pulse generator circuit 47. Pulses from circuit 47 are fed to missing pulse detector 49 which produces a signal when no pulse is received from pulse generator 47 for approximately one-sixth of the electric power cycle.

Repetitive missing pulse signals from missing pulse detector 49 activate a fault circuit 51 and cause it to remain in the fault condition. The fault signal from fault circuit 51 is directed to a delay circuit 53 which introduces a delay of approximately 350 milliseconds before operation of driver and relay circuit 55 which operates relay 35 and indicator lamp 7.

Figure 4:
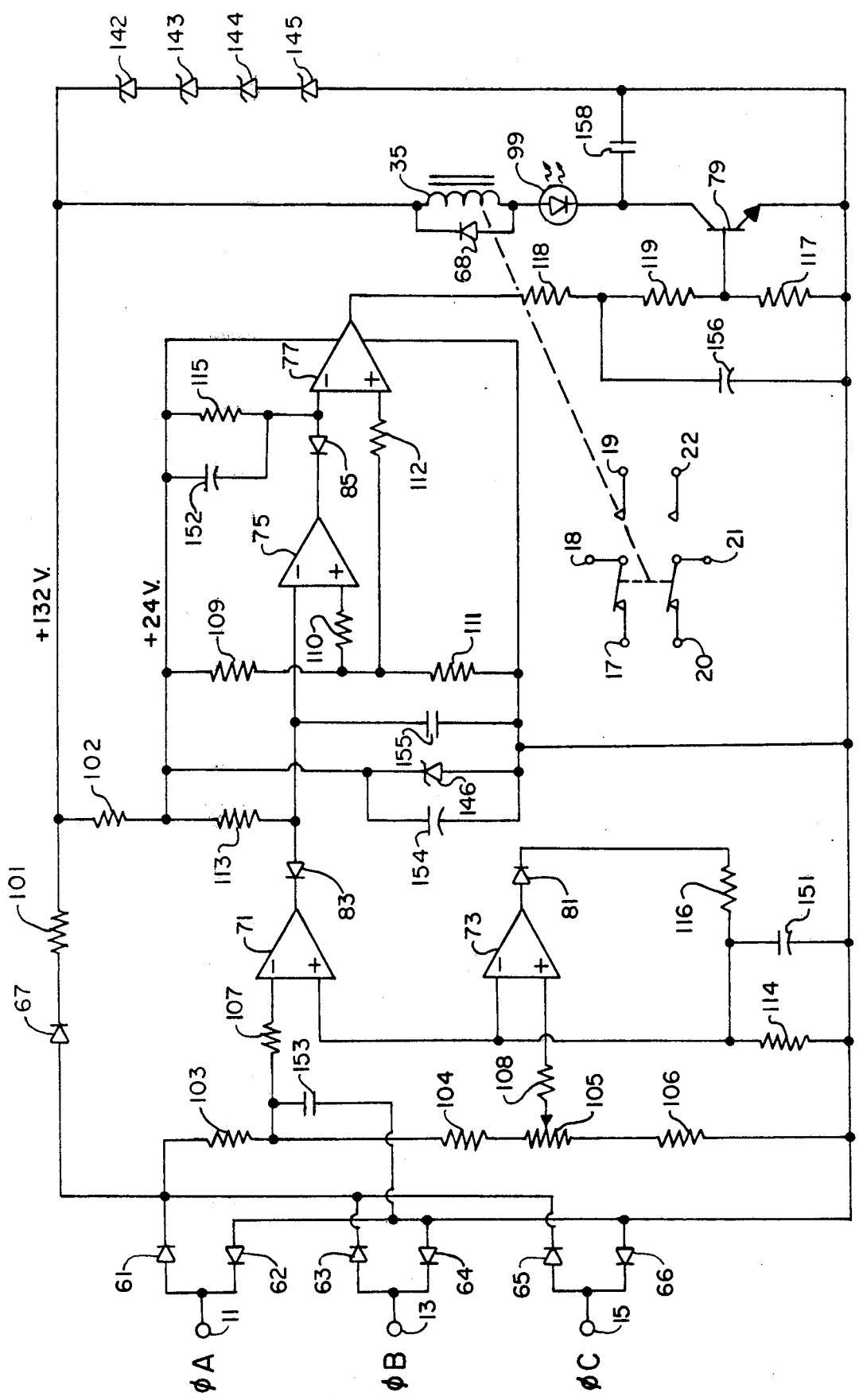
FIG. 4 is a schematic circuit diagram of the electrical circuit of the apparatus of FIGS. 1 and 2.
Figure 5:
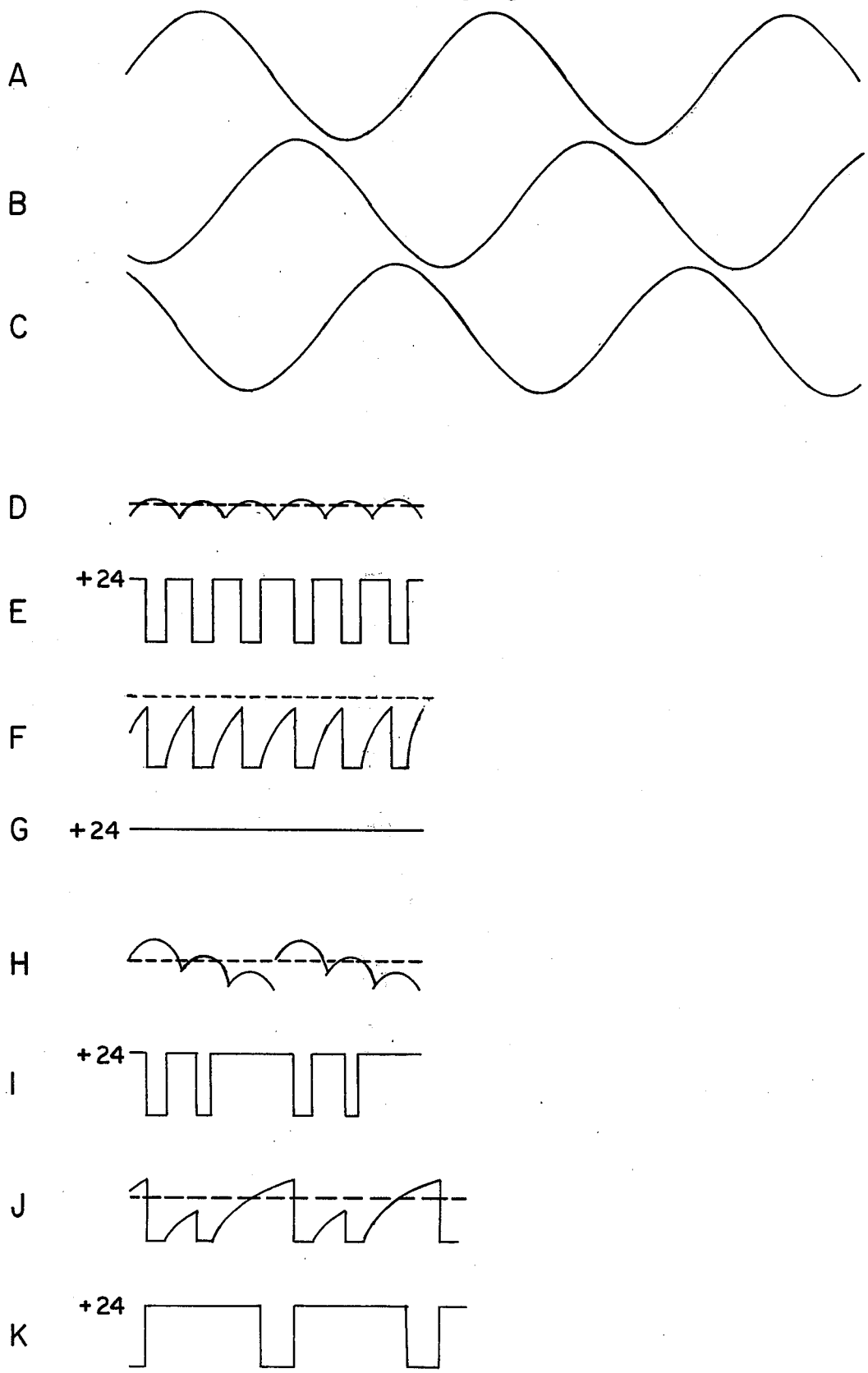
FIG. 5 is a set of wave form diagrams useful in explaining the operation of the apparatus.

The details of the operation of the apparatus will be understood from consideration of the circuit diagram of FIG. 4, and the wave-form diagram of FIG. 5.

The phase unbalance protector circuit is normally connected to a 3-phase ($\phi$A, $\phi$B and $\phi$C) power source at input terminals 11, 13 and 15 (see A, B and C of FIG. 5). Diodes 61–66 comprise a full-wave 3-phase bridge rectifier. The output from this bridge consists of a series of pulses superimposed on a DC voltage as in wave-form D of FIG. 5. This output is fed to the power supply 43, including diode 67, resistor 101, zener diodes 142–145, resistor 102, and diode 146, used to provide +24 V.D.C. to operate the circuits, and +132 V.D.C. to operate the output relay 35. The output from the diodes 61, 63 and 65 is also fed to a voltage divider consisting of resistors 103 through 106. The value of resistor 103 is selected to produce a peak voltage at the junction of resistors 103 and 104 of approximately 6 V. with a nominal line voltage. The voltage at the junction of resistors 103 and 104 is fed through resistor 107 (an isolation resistor as are resistors 108, 110, and 112) to the inverting input of operational amplifier 71. A voltage that is adjustable from approximately 4% to 20% less than that at the junction of resistors 103 and 104 is tapped off the divider by the movable contact of variable resistor 105; this voltage is fed to a peak detector and lock circuit comprising operational amplifier 73, diode 81, resistors 116 and 114 and capacitor 151.

The voltage present at the junction of resistors 114 and 116, and capacitor 151 will be a DC voltage equal to the peak value of the highest pulse appearing at the junction of resistors 105 and 108. This DC voltage is fed to the non-inverting input of amplifier 71. If all phases are equal in amplitude and pulses at the junction of resistors 103 and 104 will all be equal in amplitude as in FIG. 5D. Since the DC voltage at the non-inverting input of amplifier 71 is from 4% to 20% less than the peak amplitude of the pulses appearing at its inverting input, its output will consist of a series of negative going pulses as in wave-form E of FIG. 5. If any phase is lower in amplitude than the highest phase by a percentage that is greater than the percentage difference between the DC voltage at the non-inverting input of amplifier 71 and the peak pulse amplitude at its inverting input (see FIG. 5H), then no negative going pulse will appear at the output of amplifier 71 for that phase (see FIG. 5I). This "missing pulse" is detected by the missing pulse circuit consisting of capacitor 155, resistors 109, 111, and 113, and amplifier 75.

Each time the output of amplifier 71 goes low, any voltage on capacitor 155 is discharged, through diode 83, to common; between pulses capacitor 155 is charged through resistor 113 which is connected to the 24 V supply. The time constant of resistor 113 and capacitor 115 is selected so that in the time period between pulses when capacitor 155 is being charged its voltage does not reach the reference voltage (approximately 12 V.D.C.) applied to the non-inverting input of amplifier 75. See wave-form F. This reference voltage is determined by resistors 109 and 111. As long as there is no missing pulse the non-inverting input is always more positive than the inverting input so the output of amplifier 75 remains high. See FIG. 5, wave-form G. When a phase is low and a pulse is missing at the output of amplifier 71 the charge on capacitor 155 is not discharged therefore it continues to charge through resistor 113, and in the time before the next pulse appears at the output of amplifier 71 the voltage on capacitor 155 will extend the reference voltage applied to the non-inverting input of amplifier 71 (wave-form J), and its output will go low until the next pulse from amplifier 71 discharges capacitor 155 (wave-form K). In effect then when a pulse is missing from the output of amplifier 71 a pulse appears at the output of amplifier 75.

When a pulse appears at the output of amplifier 75, capacitor 152, which is normally discharged by resistor 115, is rapidly charged through diode 85. Because the time constant of capacitor 152 and resistor 115 is long compared to the period of the 60 Hz input, the voltage on the inverting input of A3 remains lower than the reference voltage applied to the non-inverting input of fault circuit amplifier 77 for a period of time that exceeds the time period between missing pulses. Therefore the output of amplifier 77 is continuously high when there is a fault condition.

The high potential of the output of amplifier 77 is fed through a time delay consisting of resistors 118, 119 and capacitor 156 to the base of transistor 79, which then energizes output relay 35. Resistor 117 is a base shunt resistor.

The normally open contacts (e.g. between terminals 18 and 19) are typically used to operate a shunt-trip circuit breaker which disconnects the protected load soon after the fault condition arises.

As previously mentioned, the phase unbalance protector has a brief delay in operation, primarily due to the delay circuit 53. The nominal operating delay for the apparatus is 350 milliseconds and the release delay is 50 milliseconds. It may be noted that the time constant for the peak voltage lock circuit 45 associated with capacitor 151 and resistor 114 is about one second. This period is long enough for there to be little change in the output of amplifier 73 in the fraction of a cycle between two phase pulses. It is desirable, however, that this time constant not be too long because of the possibility of a voltage drop affecting all phases together. In such a circumstance it is not desirable for a false phase unbalance signal to be given. In fact, the circuit with the circuit element values as shown in Table I below, provides the necessary time constants to avoid false unbalance indications in the presence of all-phase voltage drops. Specifically, the time constant associated with amplifier 73 permits the stored peak voltage to decay by as much as 25% during the 350 millisecond delay time provided for the driver and relay circuit. Thus, although internally the missing pulse detection circuit and the fault circuit may detect a fault for rapid drops in all phases, the peak voltage circuit output will decay and terminate the fault indications before there is an output from the driver and relay circuit. The values in Table I are for a 60 Hz 208/240 V. electric power system.

TABLE I

| Resistors | Ohms |
|---|---|
| 101 | 18K (10W.) |
| 102 | 22K (1W.) |
| 103 | 300K (2W. 5%) |
| 104 | 220 |
| 105 | 1K |
| 106 | 4.7K |
| 107 | 47K |
| 108 | 47K |
| 109 | 47K |
| 110 | 47K |
| 111 | 47K |
| 112 | 47K |
| 113 | 270K |
| 114 | 1M |
| 115 | 1M |
| 116 | 1K |
| 117 | 1K |
| 118 | 13K |
| 119 | 1K |
| Relay 35 | 18K |

| Capacitors: | Microfarads |
|---|---|
| 151 | 1.0 |
| 152 | 1.0 |
| 153 | .01 |
| 154 | 15 |
| 155 | .015 |
| 156 | 47 |
| 158 | .003 |

TABLE I-continued

| Diodes: | Number |
|---|---|
| 61–68 | IN 4007 |
| 81, 83, 85 | IN 914 |
| Zeners: | Volts |
| 142–145 | 33 |
| 146 | 24 |

OPAMPS 71, 73, 75 and 77 are sections of I.C. No. LM324
Transistor 79 is No. MPSA-42
L.E.D. 99 is No. HP5082-4850

The circuits shown in FIG. 4 in general are analog circuits. It will be appreciated that in accordance with known techniques digital components for timing, counting pulses, etc., may be substituted for some or all of the operational amplifier and analog circuits of FIG. 4.

Installation of the apparatus of the invention by the user is quite simple. The three lines of the 3-phase power line are, of course, connected to terminals 11, 13 and 15, respectively (the order of connection is not significant). The phase unbalance protection apparatus is customarily employed in a system which has a circuit breaker such as a shunt-trip circuit breaker with external terminals which will operate the circuit breaker.

In the usual case the external terminals of the circuit breaker are connected to a pair of normally open terminals (e.g. terminals 17 and 18), and closing of the contacts operates the circuit breaker in a fraction of a second thereby disconnecting the protected load from the 3-phase power line. If the 3-phase power line has individual phase fuses or circuit breakers at the entry of the installation the phase unbalance protector may be connected after these fuses or circuit breakers so that phase failure due to disconnection by a single phase fuse or circuit breaker will be detected by the phase unbalance protector. In fact, the phase unbalance protector can be connected at any point, even on a motor after the shunt-trip circuit breaker or other device the protector is connected to operate. As previously mentioned it is normally unnecessary for the user to adjust the sensitivity of the phase unbalance protector, but such adjustment may be readily made externally by the use of the screw adjustment 27 of variable resistor 105. There are, of course, numerous industrial applications for the phase unbalance protector and the optimum sensitivity adjustment would depend upon the particular application. It may be stated generally that where the application involves predominantly motor loads, and the main concern is utility-caused phase failure, high sensitivity, for example a 2% setting, would be desirable.

From the foregoing explanation it will be seen that a phase unbalance protector for multi-phase electrical systems is provided which is quite simple and thus highly reliable and relatively inexpensive to manufacture. At the same time the phase unbalance protector is very effective in detecting quite small phase unbalances and is not prone to producing false fault signals.

In addition to the variations and modifications to the invention described and suggested above, other modifications and variations will be apparent to those skilled in the art and accordingly the scope of the invention is not to be interpreted as limited to the specific variations shown or described, but is rather to be determined by reference to the appended claims.

What is claimed is:

1. Phase unbalance protection apparatus for a load supplied from a multi-phase electric power line of predetermined frequency comprising
   first means for producing and at least temporarily holding a first signal representative of the peak voltage value of the highest voltage phase of said multi-phase electric power line,
   second means for generating a second signal representative of the instantaneous maximum of the phase voltage of said multi-phase electric power line,
   third means for comparing said second signal with said first signal and generating a missing pulse signal when said second signal fails during at least a predetermined fraction of a cycle of said power line frequency to represent a phase maximum voltage at least equal to a predetermined portion of the peak voltage represented by said first signal, and
   fourth means responsive to said third means for producing a fault signal upon persistent occurence of said missing pulse signal.

2. Apparatus as recited in claim 1 further including a pair of electrical terminals and means responsive to said fourth means for establishing a conductive connection between said terminals only during presence of said fault signal.

3. Apparatus as recited in claim 2 wherein said terminals are external terminals.

4. Apparatus as recited in claim 3 further including an indicator at least indirectly responsive to said missing pulse signal.

5. Apparatus as recited in claim 1 wherein said first means holds said first signal only temporarily.

6. Apparatus as recited in claim 1 wherein said first means only holds said first signal for about one-third cycle to about thirty cycles of said power line frequency.

7. Apparatus as recited in claim 1 further including means for adjusting said predetermined portion of the peak voltage between about 80% and about 96%.

8. Apparatus as claimed in claim 1 wherein said third means includes a pulse generating means for generating a pulse whenever a phase maximum voltage is at least equal to said predetermined portion of the peak voltage.

9. Phase unbalance protection apparatus for a load supplied from a multi-phase electric power line of predetermined frequency comprising
   first means for producing and temporarily holding in a capacitor a first voltage signal representative of the peak voltage value of the highest voltage phase of said multi-phase electric power line,
   second means for generating a second voltage signal representative of the instantaneous maximums of the phase voltage of said multi-phase electric power line,
   third means for comparing said second voltage signal with said first voltage signal and generating a pulse signal when said second signal represents a phase maximum voltage at least equal to a predetermined portion of the peak voltage represented by said first signal,
   fourth means responsive to said third means for generating a missing pulse signal when said second signal fails during at least a predetermined fraction of a cycle of said power line frequency to represent a phase maximum voltage at least equal to said predetermined portion of the peak voltage represented by said first signal, and
   fifth means responsive to said fourth means for producing a fault signal upon persistent occurence of said missing pulse signal.

10. Apparatus as recited in claim 9 further including a pair of electrical terminals and means responsive to said fourth means for establishing a conductive connection between said terminals only during presence of said fault signal.

11. Apparatus as recited in claim 9 further including an indicator at least indirectly responsive to said missing pulse signal.

12. Apparatus as recited in claim 9 wherein said first means holds said first signal only temporarily.

13. Apparatus as recited in claim 9 wherein said first means only holds said first signal for about one-third cycle to about thirty cycles of said power line frequency.

14. Apparatus as recited in claim 9 further including means for adjusting said predetermined portion of the peak voltage between about 80% and about 96%.

15. Phase unbalance protection apparatus for a load supplied from a multi-phase electric power line of predetermined frequency comprising
   a full-wave bridge rectifier,
   first means responsive to said rectifier for producing and temporarily holding in a capacitor a first voltage signal representative of the peak voltage value of the highest voltage phase of said multi-phase electric power line,
   second means responsive to said rectifier for generating a second voltage signal representative of the instantaneous maximums of the phase voltage of said multi-phase electric power line,
   third means for comparing said second voltage signal with said first voltage signal and generating a pulse signal when said second signal represents a phase maximum voltage at least equal to a predetermined portion of the peak voltage represented by said first signal,
   fourth means responsive to said third means for generating a missing pulse signal when said second signal fails during at least a predetermined fraction of a cycle of said power line frequency to represent a phase maximum voltage at least equal to said predetermined portion of the peak voltage represented by said first signal, and
   fifth means including a delay circuit responsive to said fourth means for producing a fault signal upon persistent occurence of said missing pulse signal.

16. Apparatus as recited in claim 15 further including a pair of electrical terminals and means responsive to said fourth means for establishing a conductive connection between said terminals only during presence of said fault signal.

17. Apparatus as recited in claim 15 further including an indicator at least indirectly responsive to said missing pulse signal.

18. Apparatus as recited in claim 15 wherein said first means holds said first signal only temporarily.

19. Apparatus as recited in claim 15 wherein said first means only holds said first signal for about one-third cycle to about thirty cycles of said power line frequency.

20. Apparatus as recited in claim 15 further including means for adjusting said predetermined portion of the peak voltage between about 80% and about 96%.

* * * * *